US012566070B2

(12) United States Patent
Nakamata et al.

(10) Patent No.: US 12,566,070 B2
(45) Date of Patent: Mar. 3, 2026

(54) DETERMINATION APPARATUS AND DETERMINATION METHOD

(71) Applicant: ISUZU MOTORS LIMITED, Yokohama (JP)

(72) Inventors: Keisuke Nakamata, Fujisawa (JP); Hirotaka Ueda, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 182 days.

(21) Appl. No.: 18/515,351

(22) Filed: Nov. 21, 2023

(65) Prior Publication Data

US 2024/0175692 A1     May 30, 2024

(30) Foreign Application Priority Data

Nov. 29, 2022     (JP) ................................. 2022-189811

(51) Int. Cl.
*G01C 21/00* (2006.01)
*G01C 21/34* (2006.01)

(52) U.S. Cl.
CPC ................................ *G01C 21/3407* (2013.01)

(58) Field of Classification Search
CPC .............. G01C 21/3407; B62D 15/026; B62D 15/0265; B60W 2552/40; B60W 2554/801; B60W 2554/802; B60W 2555/20; B60W 2710/207; B60W 30/165; B60W 40/10; B60W 30/18145
See application file for complete search history.

(56) References Cited

U.S. PATENT DOCUMENTS 6,311,123 B1 * 10/2001 Nakamura ............ G01S 13/931
                                                    123/352
2019/0233034 A1 * 8/2019 Viele ........................ B60D 1/36
2020/0073396 A1 * 3/2020 Shimizu ............... G05D 1/0219
2020/0339194 A1   10/2020 Kanoh
2021/0094577 A1 * 4/2021 Shalev-Shwartz ..........................
                                                    B60W 60/001

FOREIGN PATENT DOCUMENTS

JP      2007176290 A  *  7/2007
JP      2017061281 A  *  3/2017
JP      2019-043395 A     3/2019
WO      2019142312 A1     7/2019

OTHER PUBLICATIONS

Translation of JP-2017061281-A. Kubo, Takatsugu. Steering Assistance Control Apparatus. Mar. 30, 2017 (Year: 2017).*
Translation of JP-2007176290-A. Sawada, Shinji. Driving Support Device. Jul. 12, 2007 (Year: 2007).*

* cited by examiner

*Primary Examiner* — Khoi H Tran
*Assistant Examiner* — Tien Minh Le
(74) *Attorney, Agent, or Firm* — Shih IP Law Group, PLLC

(57) ABSTRACT

A determination apparatus includes a distance acquisition part that acquires a longitudinal distance in a traveling direction of a host vehicle between a preceding vehicle that the host vehicle is following and the host vehicle, and a determination part that determines, as a target turning curvature, a curvature that is smaller than a predetermined curvature if the longitudinal distance is less than a determination distance corresponding to a maximum curvature at which the host vehicle can turn.

12 Claims, 5 Drawing Sheets

DETERMINATION APPARATUS AND DETERMINATION METHOD

CROSS-REFERENCE TO RELATED APPLICATIONS

The present application claims priority to Japanese Patent Applications number 2022-189811, filed on Nov. 29, 2022, contents of which are incorporated herein by reference in their entirety.

BACKGROUND OF THE INVENTION

The present disclosure relates to a determination apparatus and a determination method for determining a target turning curvature of a host vehicle. A technique for causing a host vehicle to travel so as to follow a preceding vehicle that travels in front of the host vehicle has been disclosed. WO.2019142312.A1 discloses a technique for causing a host vehicle to follow a preceding vehicle by determining that the preceding vehicle made a lane change when a moving amount of the preceding vehicle in the vehicle width direction exceeds a threshold value.

However, if a host vehicle follows a preceding vehicle that is changing lanes while the host vehicle is approaching the preceding vehicle, a steering angle of the host vehicle increases, and that would cause the host vehicle to move significantly in the vehicle width direction. In this case, the safety at the time of following the preceding vehicle may decrease since the host vehicle would collide with another vehicle, or the like.

BRIEF SUMMARY OF THE INVENTION

The present disclosure focuses on this point, and its object is to prevent excessive steering of a host vehicle when following a preceding vehicle.

A first aspect of the present disclosure provides a determination apparatus including: a distance acquisition part that acquires a longitudinal distance, in a traveling direction of a host vehicle, between a preceding vehicle that the host vehicle is following and the host vehicle; and a determination part that determines, as a target turning curvature, a curvature that is smaller than a predetermined curvature, if the longitudinal distance is less than a determination distance corresponding to the maximum curvature at which the host vehicle can turn.

A second aspect of the present disclosure provides a determination method executed by a processor mounted on a host vehicle, the determination method including: acquiring a longitudinal distance, in a traveling direction of the host vehicle, between a preceding vehicle that the host vehicle is following and the host vehicle; judging whether or not the longitudinal distance is less than a determination distance corresponding to a maximum curvature at which the host vehicle can turn; and determining, as a target turning curvature, a curvature that is smaller than a predetermined curvature, if the longitudinal distance is less than the determination distance.

A third aspect of the present disclosure provides a determination apparatus including: a distance acquisition part that acquires a longitudinal distance, in a traveling direction of a host vehicle, between a preceding vehicle and the host vehicle; and a determination part that determines a target turning curvature of the host vehicle, wherein the determination part may determine the target turning curvature on the basis of a first determination method if the longitudinal distance is equal to or greater than a determination distance, and determine the target turning curvature on the basis of a second determination method different from the first determination method if the longitudinal distance is less than the determination distance, and the target turning curvature determined on the basis of the second determination method may be smaller than the target turning curvature determined on the basis of the first determination method.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Outline of a Determination Apparatus

Figure 1:
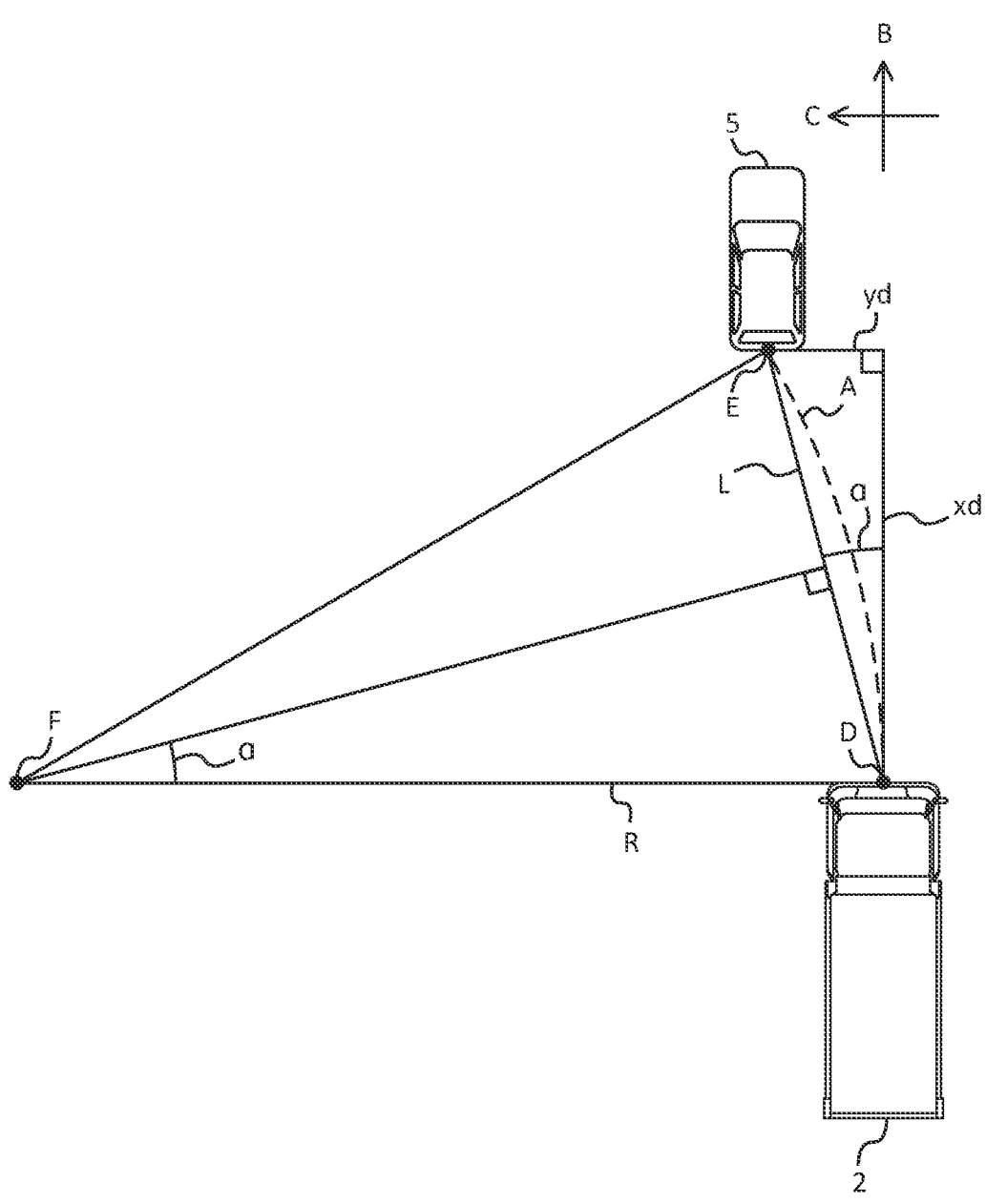
FIG. 1 illustrates an outline of a determination apparatus according to an embodiment.

FIG. 1 illustrates an outline of a determination apparatus according to an embodiment. A determination apparatus 1 according to the embodiment is mounted on a host vehicle 2. The host vehicle 2 is a self-driving vehicle. The host vehicle 2 travels so as to follow a preceding vehicle 5 that travels in front of the host vehicle 2. For example, the host vehicle 2 travels so as to follow movement of the preceding vehicle 5 in a vehicle width direction C by controlling a steering wheel of the host vehicle 2 so that a steering angle corresponds to a curvature of an arc A having a line segment DE connecting a position D of the host vehicle 2 and a position E of the preceding vehicle 5, as its chord.

When a longitudinal distance xd between the host vehicle 2 and the preceding vehicle 5 in a traveling direction B of the host vehicle 2 is short, the curvature of the arc A increases, thereby increasing the steering angle. When the steering angle increases, a distance traveled by the host vehicle 2 in the vehicle width direction C increases, and therefore there is a risk that the host vehicle 2 and another vehicle traveling beside the host vehicle 2 may collide with each other. Therefore, the determination apparatus 1 determines, as a target turning curvature, a curvature that is smaller than the curvature of the arc A when the longitudinal distance xd becomes less than a determination distance and the curvature of the arc A becomes greater than a predetermined curvature. By doing this, even if the curvature of the arc A becomes greater than a predetermined curvature, the determination apparatus 1 can prevent the target turning curvature from becoming too large. As a result, since the host vehicle 2 can determine the steering angle corresponding to the target turning curvature which is smaller than the curvature of the arc A, it can prevent an excessive increase in the steering angle.

Configuration of the Determination Apparatus 1

Figure 2:
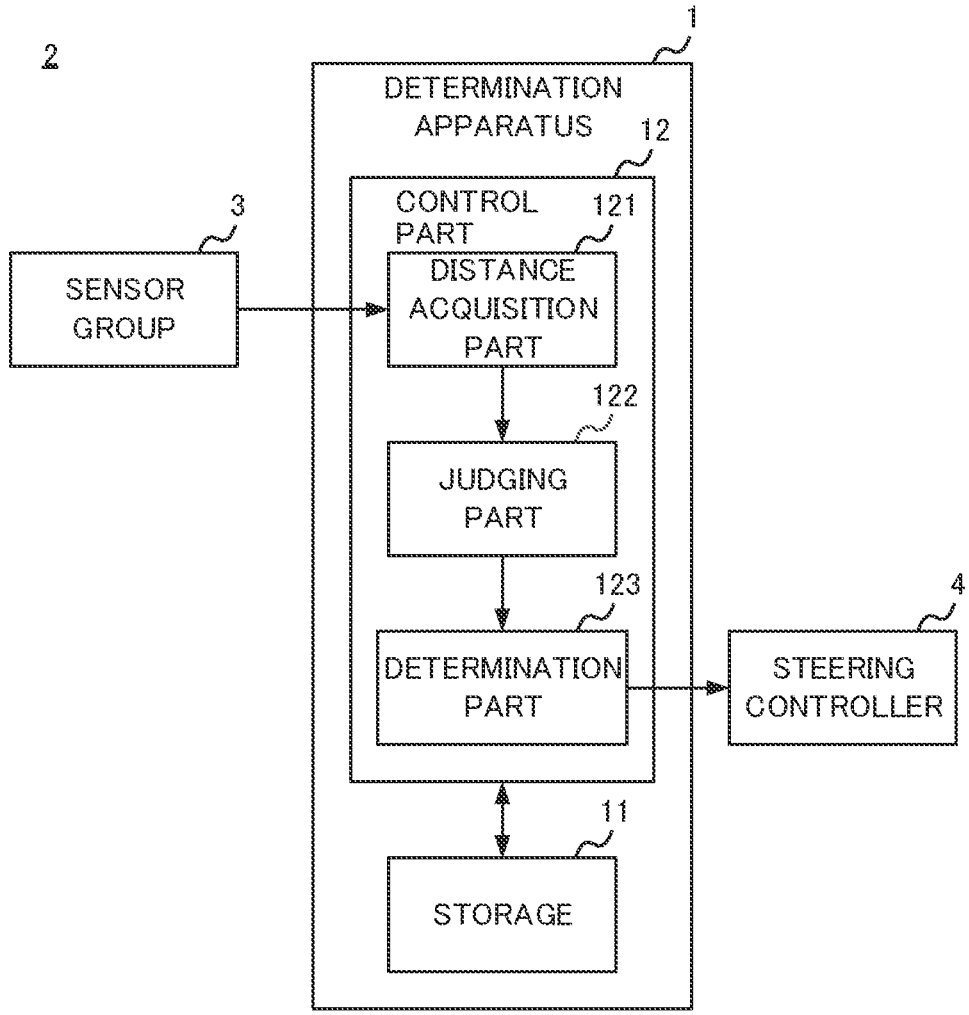
FIG. 2 illustrates a configuration of the determination apparatus.

FIG. 2 illustrates a configuration of the determination apparatus 1. The host vehicle 2 includes a sensor group 3 and a steering controller 4 that controls a steering angle of the host vehicle 2.

The sensor group 3 is a group of sensors that detect a state of the host vehicle 2 and the surrounding environment. The sensor group 3 includes a vehicle speed sensor that detects a vehicle speed as the state of the host vehicle 2, and detects the vehicle speed of the host vehicle 2, for example. Further, the sensor group 3 includes external sensors such as a camera, a radar, and Light Detection and Ranging (LI-DAR)), serving as sensors for detecting the surrounding environment. The sensor group 3 outputs output values of the external sensors to the determination apparatus 1.

The determination apparatus 1 includes a storage 11 and a control part 12. The storage 11 includes storage media such as a read only memory (ROM), a random access memory (RAM), and a hard disk. The storage 11 stores a program executed by the control part 12.

The control part 12 is a calculation resource including a processor such as a central processing unit (CPU). By executing the program stored in the storage 11, the control part 12 functions as the distance acquisition part 121, the judging part 122, and the determination part 123.

The distance acquisition part 121 acquires the longitudinal distance xd in the traveling direction B (FIG. 1) and a lateral distance yd (FIG. 1) between the host vehicle 2 and the preceding vehicle 5 in the vehicle width direction C orthogonal to the traveling direction B, on the basis of the output values of the sensor group 3. For example, the distance acquisition part 121 acquires the longitudinal distance xd and the lateral distance yd by analyzing a captured image captured by the camera of the sensor group 3. The distance acquisition part 121 may acquire the longitudinal distance xd and the lateral distance yd on the basis of an angle α and a length L of the line segment DE shown in FIG. 1. The angle α is an angle formed by (i) a straight line passing through the position D of the host vehicle 2 and parallel to the traveling direction B and (ii) the line segment DE. Specifically, the distance acquisition part 121 identifies the angle α and the length L of the line segment DE, which is the distance between the host vehicle 2 and the preceding vehicle 5, using a detection value detected by the radar or LIDAR of the sensor group 3, and acquires the longitudinal distance xd and the lateral distance yd using the identified length L and angle α.

The judging part 122 judges whether or not the longitudinal distance xd is less than a determination distance T. The determination distance T is a value corresponding to the maximum curvature $\rho_{max}$. The maximum curvature $\rho_{max}$ is a curvature at which the host vehicle 2 can turn, and is determined according to the host vehicle 2's specifications or the like. Specifically, the determination distance T is a value corresponding to the maximum curvature $\rho_{max}$ and the lateral distance upper limit value $y_{max}$. A driver driving a vehicle may determine the lateral distance upper limit value $y_{max}$ in consideration of the maximum position, safety, and the like at the time when he/she follows the preceding vehicle 5. A specific value of the lateral distance upper limit value $y_{max}$ is, for example, 1.25 meters, but is not limited thereto.

The determination distance T is represented by the following Equation 1.

[Equation 1]

$$T = \sqrt{\frac{2y_{max}}{\rho_{max}} - y_{max}^2} \tag{1}$$

As shown in Equation 1, the determination distance T is represented by the square root of a value obtained by subtracting the square of the lateral distance upper limit value y max from the ratio of a value twice the lateral distance upper limit value $y_{max}$ to the maximum curvature $\rho_{max}$.

The determination part 123 determines a target turning curvature ρ on the basis of the longitudinal distance xd and the lateral distance yd. If the longitudinal distance xd is equal to or greater than the determination distance T, the determination part 123 determines, as the target turning curvature ρ, a curvature $\rho_0$ of the arc A having the segment DE as its chord.

If the longitudinal distance xd is less than the determination distance T, the determination part 123 determines, as the target turning curvature ρ, a curvature that is smaller than the predetermined curvature. Specifically, if the longitudinal distance xd is less than the determination distance T, the determination part 123 determines, as the target turning curvature ρ, a curvature that is smaller than the curvature $\rho_0$ of the arc A having the segment DE as its chord. The curvature $\rho_0$ of the arc A is represented by the reciprocal of a radius R (FIG. 1) of the arc A. The radius R is equal to the length of a side FD as well as the length of a side FE of an isosceles triangle FDE, shown in FIG. 1. A relationship between the length L of the line segment DE and the radius R is represented by L=2R sin α. Further, using sin α=Y/L, the curvature $\rho_0$ of the arc A is represented by the following Equation 2.

[Equation 2]

$$\rho_0 = \frac{1}{R} = \frac{2\sin\alpha}{L} = \frac{2}{L}\frac{y}{L} = \frac{2y}{L^2} = \frac{2y}{x^2 + y^2} \tag{2}$$

If the longitudinal distance xd is equal to or greater than the determination distance T, the determination part 123 determines, as the target turning curvature ρ, a curvature $\rho_0$ of the arc A which is determined by substituting the acquired longitudinal distance xd and the acquired lateral distance yd into x and y of Equation 2, respectively. In other words, the determination part 123 determines the target turning curvature ρ on the basis of a first determination method when the longitudinal distance xd is equal to or greater than the determination distance T. The first determination method is a method of determining, as the target turning curvature ρ, a curvature $\rho_T$ obtained by substituting the longitudinal distance xd and the acquired lateral distance yd into Equation 2.

If the longitudinal distance xd is less than the determination distance T, the determination part 123 determines, as the target turning curvature ρ, a curvature that is smaller than a curvature $\rho_0$ of the arc A which is determined by substituting the acquired longitudinal distance xd and the acquired lateral distance yd into x and y of Equation 2, respectively. In other words, the determination part 123 determines the target turning curvature ρ on the basis of a second determination method in which a curvature that is smaller than the curvature obtained by the first determination method is determined as the target turning curvature ρ, when the longitudinal distance xd is less than the determination distance T. Specifically, if the longitudinal distance xd of the host vehicle 2 is less than the determination distance T, the determination part 123 determines, as the target turning curvature ρ, the curvature $\rho_T$ obtained by substituting the determination distance T and the acquired lateral distance yd into x and y of Equation 2, respectively.

If the longitudinal distance xd is less than the determination distance T, the curvature Po of the arc A is greater than the curvature $\rho_T$ based on the determination distance T. Therefore, by determining the curvature $\rho_T$ that is based on the determination distance T as the target turning curvature ρ, the determination part 123 can determine the curvature that is smaller than the curvature $\rho_0$ of the arc A as the target turning curvature ρ when the longitudinal distance xd is less than the determination distance T, Further, the determination part 123 executes a process of determining the target turning curvature ρ when a vehicle speed is less than a predetermined value. The predetermined value is, for example, a value for judging whether or not the host vehicle 2 is traveling on a congested road, and a specific value is 40 kilometers per hour, but the present disclosure is not limited thereto.

Figure 3:
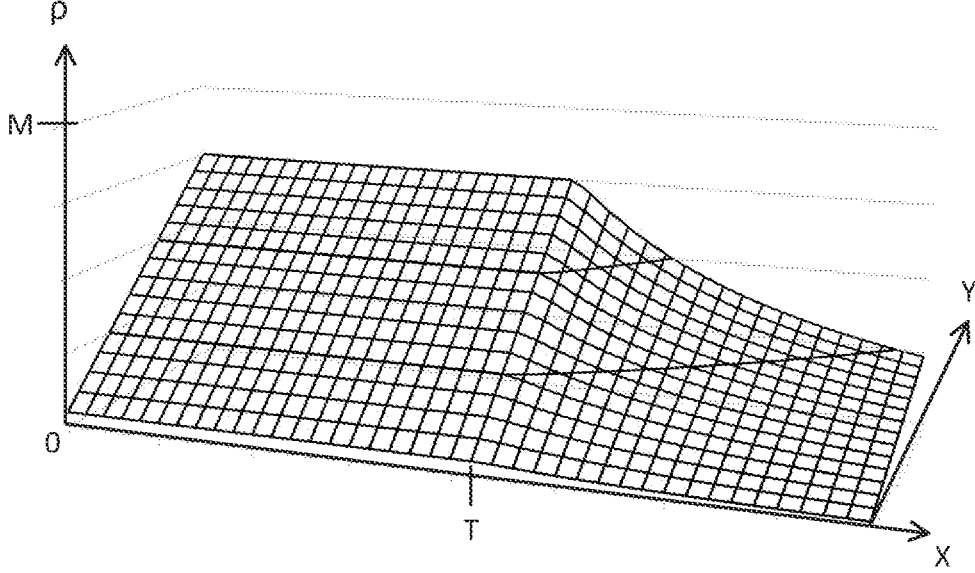
FIG. 3 is a three-dimensional graph showing a relationship between a target turning curvature $\rho$ determined by a determination part, a longitudinal distance xd, and a lateral distance yd.

FIG. 3 is a three-dimensional graph showing a relationship between the target turning curvature ρ determined by the determination part 123, the longitudinal distance xd, and the lateral distance yd. As shown in FIG. 3, the lesser the longitudinal distance xd and the greater the lateral distance yd, the more the determination part 123 increases the target turning curvature ρ. However, when the longitudinal distance xd becomes less than the determination distance T, the determination part 123 regards the longitudinal distance xd as the determination distance T and determines the target turning curvature ρ. If the longitudinal distance xd is less than the determination distance T, the determination part 123 determines the target turning curvature ρ based on the lateral distance yd and the determination distance T regardless of the longitudinal distance xd. Therefore, the target turning curvature ρ determined by the determination part 123 is not equal to or greater than a value M. By doing this, since the target turning curvature ρ does not become too large even when the longitudinal distance xd becomes less than the determination distance T, the determination part 123 can prevent the steering controller 4 from setting an excessive steering angle δ.

Figure 4:
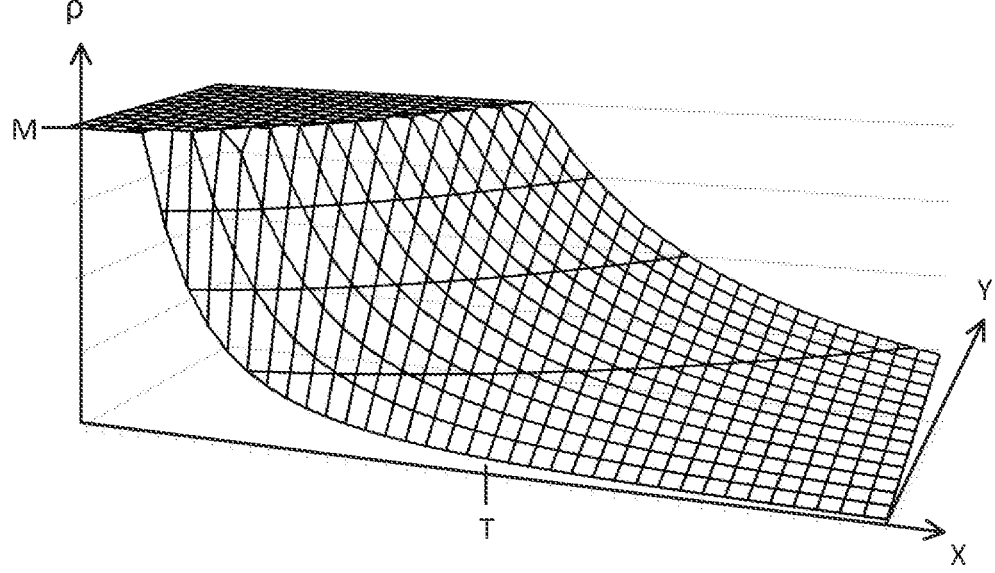
FIG. 4 is a three-dimensional graph showing a target turning curvature determined by an apparatus according to a comparative example, a longitudinal distance, and a lateral distance.

FIG. 4 is a three-dimensional graph showing a target turning curvature ρ determined by an apparatus according to a comparative example, the longitudinal distance xd, and the lateral distance yd. Even when the longitudinal distance xd becomes less than the determination distance T, the apparatus according to the comparative example determine the target turning curvature ρ by substituting the acquired longitudinal distance xd and the acquired lateral distance yd into x and y of Equation 2, respectively. As shown in FIG. 4, the target turning curvature ρ determined by the apparatus according to the comparative example increases as the host vehicle 2 approaches closer to the preceding vehicle 5. In this case, a large steering angle δ would be set, thereby causing the vehicle to move greatly in the lateral direction. Although it is omitted and not shown in the graph, the target turning curvature ρ determined by the apparatus according to the comparative example will be equal to or greater than the value M when the longitudinal distance xd is less than the determination distance T.

When the longitudinal distance xd between the host vehicle 2 and the preceding vehicle 5 is equal to or greater than the determination distance T, the determination part 123 determines the curvature $\rho_0$ of the arc A as the target turning curvature ρ. As such, when there is no risk of the target turning curvature ρ becoming too large since the host vehicle 2 and the preceding vehicle 5 are separated from each other, the determination part 123 can determine the curvature $\rho_0$ of the arc A as the target turning curvature ρ.

The steering controller 4 determines the steering angle δ corresponding to the target turning curvature ρ determined by the determination part 123. Specifically, the steering controller 4 determines the steering angle δ using the following Equation 3.

$$\delta = nl\rho \tag{3}$$

In Equation 3, n denotes the ratio (steering gear ratio) of a rotation angle of the steering wheel to a rotation angle of the steered wheels. In Equation 3, 1 denotes a wheelbase indicating a distance between a front wheel shaft and a rear wheel shaft of the host vehicle 2. When the longitudinal distance xd is less than the determination distance T, the steering controller 4 according to the embodiment can prevent the steering angle δ from becoming large even when the longitudinal distance xd decreases. This is because the target turning curvature ρ determined by the determination apparatus 1 corresponds only to the lateral distance yd.

Process of Determining the Target Turning
Curvature ρ

Figure 5:
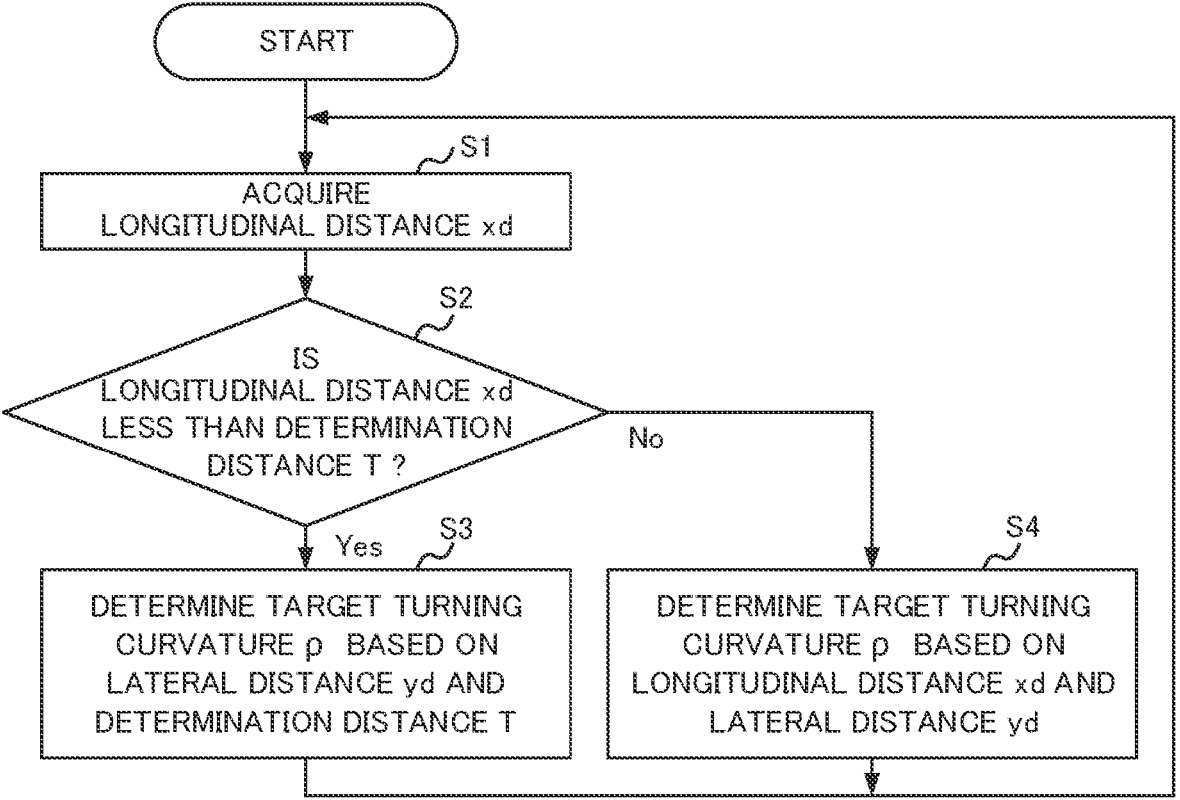
FIG. 5 is a flowchart showing an example of a process of determining the target turning curvature.

FIG. 5 is a flowchart showing an example of a process of determining the target turning curvature ρ. If the vehicle speed of the host vehicle 2 is equal to or lower than a predetermined value, the determination apparatus 1 performs the process of determining the target turning curvature ρ, and if the vehicle speed is higher than the predetermined value, the determination apparatus 1 does not perform the process of determining the target turning curvature ρ.

The distance acquisition part 121 acquires a longitudinal distance xd (step S1). Specifically, the distance acquisition part 121 identifies an angle α and a length L of a line segment DE by analyzing output values of the sensor group 3, and acquires the longitudinal distance xd and the lateral distance yd on the basis of the angle α and the length L of the line segment DE.

The judging part 122 judges whether or not the longitudinal distance xd is less than a determination distance T (step S2). If the longitudinal distance xd is less than the determination distance T (Yes in step S2), the determination part 123 determines a target turning curvature ρ based on the lateral distance yd and the determination distance T (step S3). Specifically, the determination part 123 substitutes the determination distance T into x of Equation 2 and substitutes the acquired lateral distance yd into y of Equation 2 to determine the target turning curvature ρ.

If the longitudinal distance xd is equal to or greater than the determination distance T (No in step S2), the determination part 123 determines the target turning curvature ρ based on the longitudinal distance xd and the lateral distance yd (step S4). Specifically, the determination part 123 substitutes the acquired longitudinal distance xd into x of Equation 2 and substitutes the acquired lateral distance yd into y of Equation 2 to determine the target turning curvature ρ.

Modified Example

The determination part 123 may reduce at least one of the maximum curvature $ρ_{max}$ or the lateral distance upper limit value $y_{max}$ according to the road conditions of a road on which the host vehicle 2 travels. For example, the lower a friction coefficient of a road surface of the road becomes, the more determination part 123 reduces at least one of the maximum curvature $ρ_{max}$ or the lateral distance upper limit value $y_{max}$. As a specific example, the determination part 123 sets the maximum curvature $ρ_{max}$ and the lateral distance upper limit $y_{max}$ for a case where a road surface of a road is wet, icy, or covered with snow to be smaller than the maximum curvature $ρ_{max}$ and the lateral distance upper limit $y_{max}$ for a case where the road surface of the road is dry.

The friction coefficient for dry roads is about 0.8, the friction coefficient for wet roads is from 0.4 to 0.6, the friction coefficient for snow-covered roads is from 0.2 to 0.5, and the friction coefficient for icy roads is from 0.1 to 0.2. Therefore, the determination part 123 reduces the maximum curvature $ρ_{max}$ and the lateral distance upper limit value y max in the order of dry roads, wet roads, snow-covered roads, and icy roads.

Effect of the Determination Apparatus 1

As described above, if the longitudinal distance xd between the host vehicle 2 and the preceding vehicle 5 in the traveling direction B of the host vehicle 2 is less than the determination distance T, the determination apparatus 1 determines, as the target turning curvature ρ, a curvature that is smaller than the curvature of the arc A having the segment DE connecting the host vehicle 2 and the preceding vehicle 5 as its chord. By doing this, even when the host vehicle 2 is approaching the preceding vehicle 5, the determination apparatus 1 can set the target turning curvature ρ to be smaller than the curvature of the arc A having the segment DE connecting the host vehicle 2 and the preceding vehicle 5 as its chord. In other words, since the determination apparatus 1 can set the steering angle δ corresponding to the target turning curvature ρ determined by the steering controller 4 to be smaller than the steering angle corresponding to the curvature of the arc A, excessive steering of the host vehicle 2 can be prevented. As a result, the determination apparatus 1 reduces the risk of the host vehicle 2 colliding with other vehicles and enhances the safety of the host vehicle 2.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A determination apparatus comprising:
   a processor embodying a distance acquisition part that acquires a longitudinal distance, in a traveling direction of a host vehicle, between a preceding vehicle that the host vehicle is following and the host vehicle; and
   a processor embodying a determination part that determines, as a target turning curvature, a curvature that is smaller than a curvature of an arc having a line segment connecting the host vehicle and the preceding vehicle as a chord, when the longitudinal distance is less than a determination distance corresponding to the maximum curvature at which the host vehicle can turn, wherein the determination part provides the determined target turning curvature to a steering controller, as a notification, and the steering controller controls a steering angle of the host vehicle and determines the steering angle based on the notified target turning curvature.

2. The determination apparatus according to claim 1, wherein
   the determination part determines the curvature of the arc as the target turning curvature, wherein the longitudinal distance is equal to or greater than the determination distance.

3. The determination apparatus according to claim 1, wherein
   the determination part determines, as the target turning curvature, a curvature that is smaller than the curvature of the arc, when the longitudinal distance is less than the determination distance determined by (i) a lateral distance upper limit value of a lateral distance between the host vehicle and the preceding vehicle in the lateral direction orthogonal to the traveling direction and (ii) the maximum curvature.

4. The determination apparatus according to claim 3, wherein
   the determination part determines, as the target turning curvature, a curvature that is smaller than the curvature of the arc, when the target turning curvature is less than the determination distance represented by a square root of a value obtained by subtracting the square of the lateral distance upper limit value from the ratio of a value twice the lateral distance upper limit value to the maximum curvature.

5. The determination apparatus according to claim 3, wherein
   the determination part determines the maximum curvature for a case where a road surface of a road on which the host vehicle travels is wet, icy, or covered with snow to be a smaller value than a value of the maximum curvature for a case where the road surface of the road is dry.

6. The determination apparatus according to claim 5, wherein
   the distance acquisition part acquires the longitudinal distance and the lateral distance on the basis of (i) an angle formed by a straight line passing through the host vehicle and parallel to the traveling direction and a line segment connecting the host vehicle and the preceding vehicle and (ii) a length of the line segment.

7. The determination apparatus according to claim 1, wherein
   the determination part determines a target turning curvature based on (i) a lateral distance between the preceding vehicle and the host vehicle in a lateral direction orthogonal to the traveling direction of the host vehicle and (ii) the determination distance, when the longitudinal distance is less than the determination distance.

8. The determination apparatus according to claim 1, wherein the determination part determines, as the target turning curvature, a curvature that is smaller than the curvature, when the longitudinal distance is less than the determination distance determined by (i) a lateral distance upper limit value of a lateral distance between the host vehicle and the preceding vehicle in the lateral direction orthogonal to the traveling direction and (ii) a maximum curvature at which the host vehicle can turn.

9. A determination method executed by a processor mounted on a host vehicle, the determination method comprising:

acquiring a longitudinal distance, in a traveling direction of the host vehicle, between a preceding vehicle that the host vehicle is following and the host vehicle;

judging whether or not the longitudinal distance is less than a determination distance corresponding to a maximum curvature at which the host vehicle can turn;

determining, as a target turning curvature, a curvature that is smaller than a curvature of an arc having a line segment connecting the host vehicle and the preceding vehicle as a chord, when the longitudinal distance is less than the determination distance; and providing the determined target turning curvature to a steering controller, as a notification, wherein the steering controller controls a steering angle of the host vehicle and determines the steering angle based on the notified target turning curvature.

10. A determination apparatus comprising:

a processor embodying a distance acquisition part that acquires a longitudinal distance, in a traveling direction of a host vehicle, between a preceding vehicle and the host vehicle; and a processor embodying a determination part that determines a target turning curvature of the host vehicle, wherein the determination part provides the determined target turning curvature to a steering controller as a notification, and the steering controller controls a steering angle of the host vehicle and determines the steering angle based on the notified target turning curvature;

the determination part determines, as the target turning curvature, a curvature of an arc having a line segment connecting the host vehicle and the preceding vehicle as a chord, based on a first determination method when the longitudinal distance is equal to or greater than a determination distance, and determines the target turning curvature based on a second determination method different from the first determination method when the longitudinal distance is less than the determination distance, and the target turning curvature determined based on the second determination method is smaller than the target turning curvature determined based on the first determination method.

11. The determination apparatus according to claim 10, wherein the first determination method is a method of determining a target turning curvature as a curvature of an arc defined by (i) a lateral distance between the host vehicle and the preceding vehicle in a lateral direction orthogonal to the traveling direction and (ii) the longitudinal distance, and the second determination method is a method of determining the target turning curvature based on the lateral distance and the determination distance.

12. The determination apparatus according to claim 11, wherein the first determination method is a method of determining, as the target turning curvature, a curvature expressed as a ratio of a value twice the lateral distance to the sum of the square of the longitudinal distance and the square of the lateral distance, and the second determination method is a method of determining, as the target turning curvature, a curvature expressed as a ratio of a value twice the lateral distance to the sum of the square of the determination distance and the square of the lateral distance.

* * * * *